United States Patent
Konstantinidou et al.

(10) Patent No.: US 10,440,899 B2
(45) Date of Patent: Oct. 15, 2019

(54) HEDGE TRIMMER

(71) Applicant: Andreas Stihl AG & Co. KG, Waiblingen (DE)

(72) Inventors: Fevronia Konstantinidou, Waiblingen (DE); Johannes Menzel, Rechberg (DE); David Hampe, Stuttgart (DE); Ralf Steidinger, Stuttgart (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 387 days.

(21) Appl. No.: 15/479,359

(22) Filed: Apr. 5, 2017

(65) Prior Publication Data

US 2017/0303473 A1 Oct. 26, 2017

(30) Foreign Application Priority Data

Apr. 20, 2016 (DE) .................. 10 2016 004 746

(51) Int. Cl.
*A01G 3/053* (2006.01)
*F01N 13/08* (2010.01)
*F01N 13/18* (2010.01)
*F01N 13/16* (2010.01)
*B25F 5/00* (2006.01)
*B25F 5/02* (2006.01)
(Continued)

(52) U.S. Cl.
CPC .............. *A01G 3/053* (2013.01); *B25F 5/006* (2013.01); *B25F 5/02* (2013.01); *F01N 13/08* (2013.01); *F01N 13/082* (2013.01); *F01N 13/16* (2013.01); *F01N 13/1805* (2013.01); *F01N 13/1822* (2013.01); *F01N 13/1833* (2013.01); *F01N 13/1888* (2013.01); *F02B 63/02* (2013.01); *F01N 1/00* (2013.01); *F01N 2470/30* (2013.01); *F01N 2530/18* (2013.01); *F01N 2530/22* (2013.01); *F01N 2590/06* (2013.01)

(58) Field of Classification Search
CPC ............. F01N 13/1805; F01N 13/1822; F01N 13/1833; F01N 13/08; F01N 13/082; F01N 13/16; F01N 2530/18; F01N 2530/22; F01N 2590/06; A01G 3/053; B25F 5/006; B25F 5/02
USPC .................................................. 181/227, 240
See application file for complete search history.

(56) References Cited

U.S. PATENT DOCUMENTS

| | | | |
|---|---|---|---|
| 6,164,066 A | 12/2000 | Sakaguchi et al. | |
| 7,174,991 B1 | 2/2007 | Gunnarsson et al. | |
| 9,102,077 B2 * | 8/2015 | Andersson | B23D 45/16 |

(Continued)

*Primary Examiner* — Jeremy A Luks
(74) *Attorney, Agent, or Firm* — Gudrun E. Huckett

(57) ABSTRACT

A hedge trimmer has at least one cutting blade and an internal combustion engine operatively connected to the at least one cutting blade so as to drive the at least one cutting blade reciprocatingly. The internal combustion engine has an exhaust gas muffler with an outlet for discharging exhaust gases from the exhaust gas muffler. A multi-part exhaust gas pipe is connected seal-tightly to the outlet of the exhaust gas muffler and connects the outlet of the exhaust gas muffler to an outlet opening where the exhaust gases exit from the hedge trimmer. The multi-part exhaust gas pipe has a plurality of pipe sections, including at least a first pipe section and a second pipe section, wherein the second pipe section is embodied separate from the first pipe section. At least one of the plurality of pipe sections is made of plastic material.

15 Claims, 8 Drawing Sheets

(51) Int. Cl.
*F02B 63/02* (2006.01)
*F01N 1/00* (2006.01)

(56) References Cited

U.S. PATENT DOCUMENTS

| | | | |
|---|---|---|---|
| 9,605,572 B2* | 3/2017 | Raasch | .................. F01N 1/084 |
| 9,638,088 B1* | 5/2017 | Shoshi | ................. F01N 13/082 |
| 2005/0061578 A1* | 3/2005 | Schulte | ................ F01N 13/082 |
| | | | 181/227 |
| 2006/0112683 A1 | 6/2006 | Huber | |
| 2012/0073144 A1* | 3/2012 | Tamura | ................. A01G 3/053 |
| | | | 30/272.1 |

* cited by examiner

Fig. 11
Fig. 12
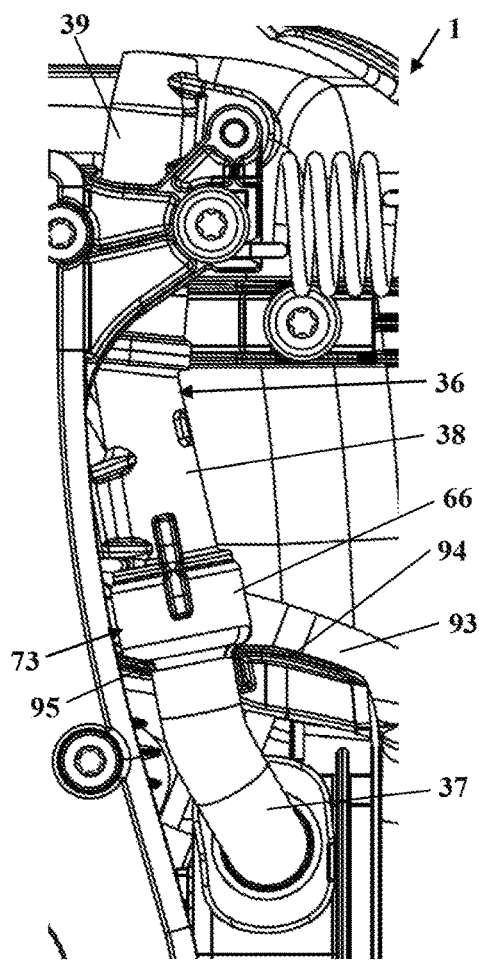
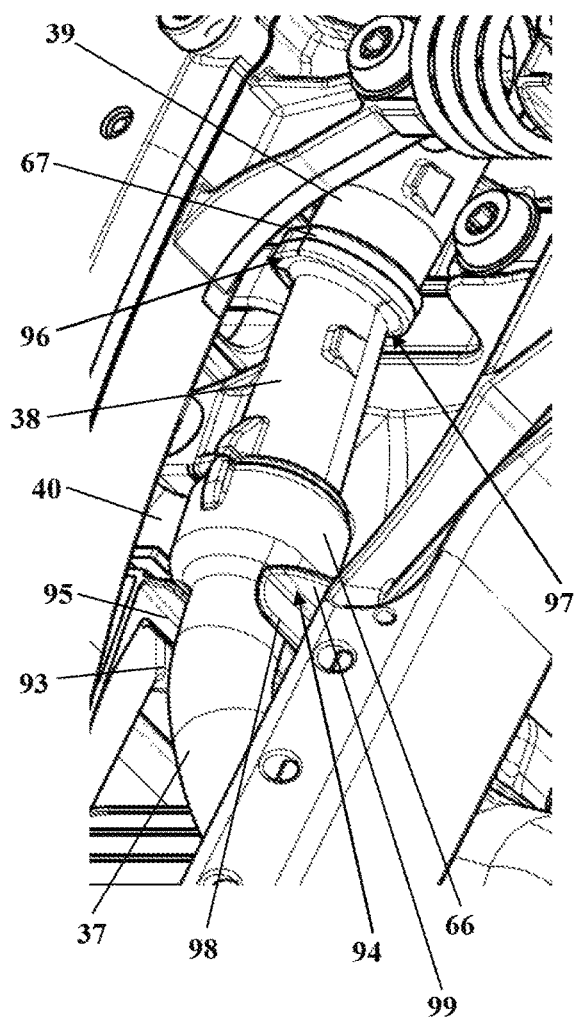

HEDGE TRIMMER

BACKGROUND OF THE INVENTION

The invention relates to a hedge trimmer comprising at least one cutting blade and comprising an internal combustion engine that reciprocatingly drives the at least one cutting blade, wherein the internal combustion engine comprises an exhaust gas muffler from which the exhaust gases are exiting through an outlet, wherein the outlet is connected by an exhaust gas pipe with an outlet opening.

US 2006/0112683 discloses a hedge trimmer comprising an internal combustion engine. The internal combustion engine comprises an exhaust gas device with an exhaust gas pipe that guides the exhaust gases of the internal combustion engine from an outlet of the internal combustion engine forwardly in the direction toward the cutting blades.

In known exhaust gas mufflers, the outlet pipe is usually arranged such that between the outlet of the exhaust gas muffler and the inlet into the exhaust gas pipe a spacing is existing where ambient air enters the exhaust gas pipe together with the exhaust gases from the exhaust gas muffler. In this way, the exhaust gas stream is cooled. Due to this spacing, the area of the outlet of the exhaust gas muffler can however become soiled because, for example, uncombusted oil or the like can escape via the outlet from the exhaust gas muffler and soil the exterior side of the exhaust gas muffler and neighboring components.

The invention has the object to provide a hedge trimmer of the aforementioned kind that has a simple configuration and a minimal soiling tendency.

SUMMARY OF THE INVENTION

In accordance with the invention, this is achieved in that the exhaust gas pipe is fixed seal-tightly on the outlet of the exhaust gas muffler, in that the exhaust gas pipe is of a multi-part configuration and comprises at least a first pipe section and a second pipe section that is embodied separate from the first pipe section, wherein at least one pipe section of the exhaust gas pipe is made of plastic material.

The invention provides that the exhaust gas pipe is seal-tightly fixed on the outlet of the muffler. Accordingly, it is prevented that oil or the like can escape from the muffler outlet. The path from the outlet of the exhaust gas muffler to the exhaust gas outlet of the housing is usually comparatively long in case of hedge trimmers. In order to prevent, for a fixed, seal-tight connection of the exhaust gas pipe to the exhaust gas muffler, excessive stress within the exhaust gas pipe due to distortions of the housing occurring in operation and to be able to compensate at the same time manufacturing tolerances in a simple way, it is provided that the exhaust gas pipe is of a multi-part configuration. The exhaust gas pipe comprises in this context at least a first pipe section and a second pipe section that is embodied separate from the first pipe section. The exhaust gas pipe is thus at least comprised of two parts. At least one pipe section of the exhaust gas pipe is comprised of plastic material. Advantageously, at least the pipe section of the exhaust gas pipe that is seal-tightly fixed on the exhaust gas muffler is made of plastic material. Preferably, all pipe sections of the exhaust gas pipe are made of plastic material. In this context, the pipe sections of the exhaust gas pipe are length sections which, in flow direction of the exhaust gas, are arranged sequentially one after another. The first and the second pipe sections must not be arranged to immediately follow each other; additional pipe sections can be provided between the first pipe section and the second pipe section. Due to the embodiment of at least one pipe section of the exhaust gas pipe of plastic material, a minimal weight of the exhaust gas pipe and thus a minimal weight of the entire hedge trimmer can be achieved.

Advantageously, the first pipe section and the second pipe section are comprised of different materials. The configuration of the exhaust gas pipe of at least two pipe sections enables a good adaptation of the employed material in regard to the requirements existing in regard to the respective pipe section. Preferably, the first pipe section is comprised of an elastomer. The first pipe section is in particular the pipe section of the exhaust gas pipe which is adjoining immediately the exhaust gas muffler. Embodying the first pipe section of an elastomer provides a high elasticity of the first pipe section. In this way, manufacturing tolerances, in particular also tolerances of the position of the outlet of the exhaust gas muffler, can be simply compensated. The elastomer is preferably a fluoroelastomer, in particular a fluororubber (FPM or FKM). Fluororubbers have good fuel resistance and high temperature resistance so that such fluororubbers can be advantageously used for the first pipe section arranged at the exhaust gas muffler. Such a fluororubber is, for example, the plastic material which is distributed by the company DuPont under the trade name VITON®. The second pipe section is comprised advantageously of a shape-stable plastic material. In this way, the second pipe section can be used in particular for fixation of the exhaust gas pipe on neighboring components of the hedge trimmer. The second pipe section is comprised preferably of a polyamide. It can however also be advantageous that the second pipe section is made of metal, in particular of light metal, preferably of magnesium. When embodying at least one pipe section of the exhaust gas pipe of a light metal, a minimal weight of the exhaust gas pipe can be achieved also. Preferably, all pipe sections of the exhaust gas pipe are comprised of plastic material or light metal, in particular magnesium.

The outlet out of the exhaust gas muffler is advantageously formed on an outlet socket. The outlet socket comprises in particular a circumferentially extending bead. A simple fixation is achieved when the first pipe section engages the bead from behind. In order to achieve a particularly good fixation of the first pipe section on the exhaust gas muffler, it can be provided that the first pipe section has a metallic insert which is secured by clamping on the exhaust gas muffler. The metallic insert is preferably elastically embodied. A particularly simple configuration results when the metallic insert is formed by at least one spring, preferably a coil spring. However, a substantially shape-stable configuration of the metallic insert can be advantageous also. Over the service life of the hedge trimmer, it is usually required to clean the exhaust gas muffler several times. For this purpose, the first pipe section of the exhaust gas muffler must be demounted. In order to ensure that the metallic insert, even after having pulled the first pipe section off the exhaust gas muffler several times, cannot become detached from the first pipe section, the metallic insert is preferably embedded by injection molding in the first pipe section. In this way, a good fixation of the metallic insert in the first pipe section is achieved. However, it can also be provided that the metallic insert is secured in a receptacle which is formed in the first pipe section. In order to enable simple demounting of the first pipe section from the exhaust gas muffler, it is advantageously provided that the first pipe section comprises a holding rim where the first pipe section can be gripped for removal from the outlet socket. The holding rim is an outwardly projecting rim. Preferably, the holding rim extends at least on two opposite sides of the first pipe section. It can also be provided that the holding rim is provided to extend mostly or completely around the circumference of the first pipe section.

The at least one cutting blade projects at a front side of the hedge trimmer in forward direction. The exhaust gases exit from the outlet opening advantageously in a blow-out direction that, relative to a usual parking position of the hedge trimmer, is oriented forwardly, i.e., from the internal combustion engine in the direction toward the cutting blades, and upwardly. Due to the orientation of the blow-out direction in forward and upward direction, the exhaust gases are directed away from the hedge to be trimmed. At the same time, soiling of the cutting blades by the exhaust gases is substantially prevented. The hedge trimmer comprises advantageously a longitudinal center plane which contains the longitudinal center axis of at least one cutting blade and is positioned perpendicular to the cutting blade plane of at least one cutting blade. In the usual parking position of the hedge trimmer, the longitudinal center plane of the hedge trimmer is advantageously oriented vertically. The longitudinal center axis of at least one cutting blade is the geometric center axis of the cutting blade which is extending in longitudinal direction. In this context, the longitudinal center axis is viewed in the length section of the cutting blade in which knives for trimming a hedge are arranged on the cutting blade. In the area of the connection to a gear drive, the cutting blade can have an extension which is deviating from the longitudinal center axis, in particular can have an angulate extension. The cutting blade plane of the cutting blade is the plane that contains the longitudinal center axis and that is extending through the knives of the cutting blade. The cutting blade is moving in this plane of the cutting blade. In this context, this plane of the cutting blade is parallel to the cutting (trimming) plane of the cutting blade and can be coinciding with the cutting (trimming) plane. The blow-out direction is oriented away from the longitudinal center plane. Accordingly, the blow-out direction is also oriented away from the cutting blades. This also prevents an excessive soiling of the cutting blades in operation.

In the area which is adjoining the outlet opening upstream, the exhaust gas pipe advantageously comprises a nozzle section in which the flow cross section decreases in the flow direction. In this way, an excessive fanning out of the exhaust gas stream at the outlet opening can be prevented in a simple way.

A simple fixation of the exhaust gas pipe is achieved when on the second pipe section a fastening eye for fixation on a housing part of the hedge trimmer is formed. At the fastening eye, the exhaust gas pipe can advantageously be screw-connected to the housing part of the hedge trimmer.

Advantageously, the exhaust gas pipe has a third pipe section that adjoins the second pipe section. By configuring the exhaust gas pipe of at least three pipe sections, a beneficial configuration of the exhaust gas pipe is achieved. Preferably, the second pipe section and the third pipe section are comprised of a substantially shape-stable plastic material. Also, configuring the second and third pipe sections of metal can be advantageous. In order to be able to produce in a simple way a beneficial blow-out direction as well as a nozzle section and a beneficial extension of the exhaust gas pipe between nozzle section and first pipe section of the exhaust gas pipe, a configuration of the exhaust gas pipe with at least three parts is advantageous. In order to be able to remove the pipe sections made of a shape-stable plastic material or of metal from a mold when manufactured by injection molding, drafts are required. An excessive change of the flow cross section across the length of the exhaust gas pipe can be avoided by embodying at least three pipe sections because the flow cross section in the direction of the connecting areas between two pipe sections can be enlarged, respectively. The second and the third pipe sections are advantageously inserted into each other across a portion of their length. In this way, a seal-tight connection of the second pipe section with the third pipe section can be achieved in a simple way. Alternatively or additionally, a seal can also be arranged between the second and the third pipe sections. The blow-out outlet opening is preferably formed on the third pipe section. The second pipe section is advantageously connected immediately to the first pipe section.

The longitudinal center axis of the second pipe section is positioned relative to the longitudinal center axis of the third pipe section advantageously at an angle that amounts to from approximately 2° to approximately 30°. In this way, a beneficial extension of the exhaust gas pipe as well as a beneficial blow-out direction are achieved. The longitudinal center axis of the second pipe section is positioned relative to the longitudinal center axis of the third pipe section preferably at an angle that amounts to from approximately 5° to approximately 15°. Preferably, the third pipe section is comprised also of shape-stable plastic material. However, it can also be provided that the third pipe section is comprised of metal, in particular light metal, preferably of magnesium. In order to achieve a good fixation of the third pipe section, the third pipe section preferably comprises a fastening eye for attachment on a housing part of the hedge trimmer.

It is advantageously provided that the hedge trimmer comprises a motor housing. For securing the position of the exhaust gas pipe, at least one rib is advantageously arranged on the motor housing. The rib delimits the movement of the exhaust gas pipe in at least one direction and is preferably arranged immediately adjacent to the exhaust gas pipe. The rib is in particular integrally formed on the motor housing, i.e., is formed monolithic with the motor housing. This provides for a simple manufacture and good positioning of the exhaust gas pipe without additional mounting steps. In an advantageous configuration, the rib comprises at least two segments that are positioned at an angle relative to each other. In this way, a high stability of the ribs can be achieved in a simple way.

Further preferred configurations result from the embodiments described in the following with the aid of the drawings.

BRIEF DESCRIPTION OF THE DRAWING

FIG. 11 is a bottom detail view of an embodiment of the hedge trimmer positioned in the parking position.

FIG. 12 is a perspective detail illustration of the embodiment of the hedge trimmer of FIG. 11 in a bottom view.

DESCRIPTION OF THE PREFERRED EMBODIMENTS

Figure 1:
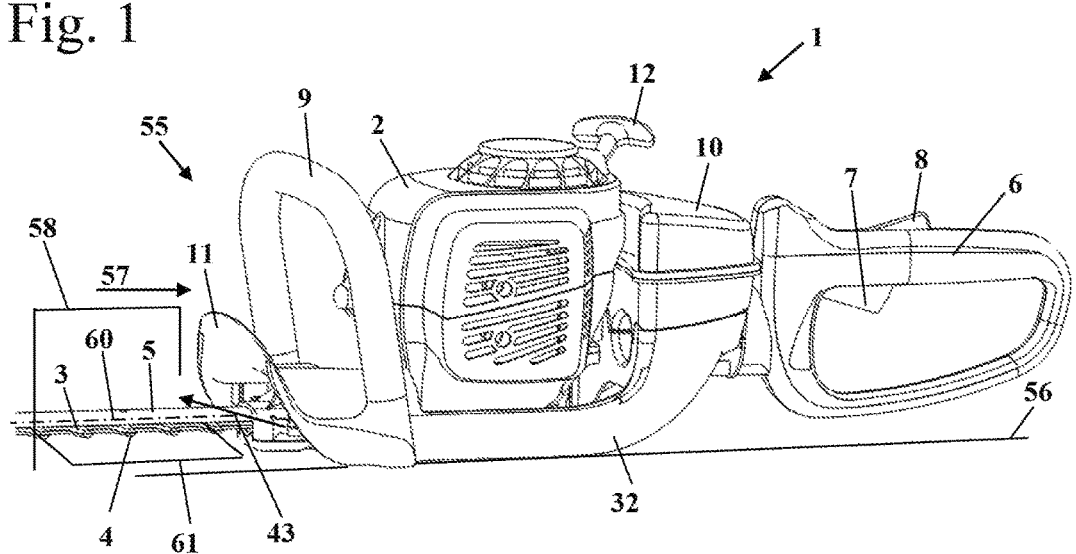
FIG. 1 is a perspective illustration of an embodiment of the hedge trimmer.

FIG. 1 shows in an exemplary fashion the configuration of a hedge trimmer 1. The hedge trimmer 1 comprises a housing 2 in which a drive motor, in the embodiment an internal combustion engine, is arranged. For starting the internal combustion engine, the starter grip 12 is provided which is projecting from the housing 2. The housing 2 is a motor housing and is held on grip housing 32. In the embodiment, a rear grip 6 is rotatably supported on the grip housing 32. On the rear grip 6, operating elements, i.e., a throttle trigger 7 as well as a throttle trigger lock 8, are supported. In the area between the housing 2 and the rear grip 6, a fuel tank 10 is integrated in the grip housing 32. The hedge trimmer 1 comprises a first cutting blade 3 and a second cutting blade 4 which are guided on a guide 5 and are driven in reciprocation by the internal combustion engine. The cutting blade 3 comprises a longitudinal center axis 60 which is extending in the longitudinal direction of the hedge trimmer 1 and in the longitudinal direction of the cutting blade 3 and which identifies the geometric center of the cutting blade 3. The cutting blade 3 has a cutting blade plane 61 that contains the longitudinal center axis 60 and that sections the knives arranged on the cutting blade 3. The cutting blade 3 moves in the cutting blade plane 61. The cutting blade plane 61 extends parallel to the cutting plane of the cutting blades 3, 4 in which the hedge or the like is trimmed. The cutting blade plane 61 may also coincide with the cutting plane. The cutting blade 4 comprises a corresponding longitudinal center axis and a cutting blade plane which is extending parallel to the cutting blade plane 61; the longitudinal center axis and the cutting blade plane of the cutting blade 4 are not shown in detail in the Figures.

On the grip housing 32, a curved handle 9 is arranged on the side of the housing 2 which is facing the cutting blades 3, 4; the curved handle 9, like the rear grip 6, serves for guiding the hedge trimmer 1. On the grip housing 32, a guard 11 is formed that shields the side of the cutting blades 3, 4 facing the housing 2. The cutting blades 3, 4 project in forward direction at the front side 57 of the hedge trimmer 1. In FIG. 1, the hedge trimmer 1 is shown in a parking position 55 in which the hedge trimmer 1 is placed onto a flat horizontal parking surface 56. In this position, the longitudinal center axis 60 of the cutting blade 3 as well as the cutting blade plane 61 are extending advantageously horizontally relative to the parking surface 56. Also, the rear grip 6 is advantageously oriented approximately parallel to the parking surface 56. The exhaust gases of the internal combustion engine are blown out of the housing 2 in a blow-out direction 43 which is oriented forwardly, i.e., in a direction away from the rear grip 6 and away from the housing 2 toward the cutting blades 3, 4, and upwardly relative to the parking position 55.

Figure 2:
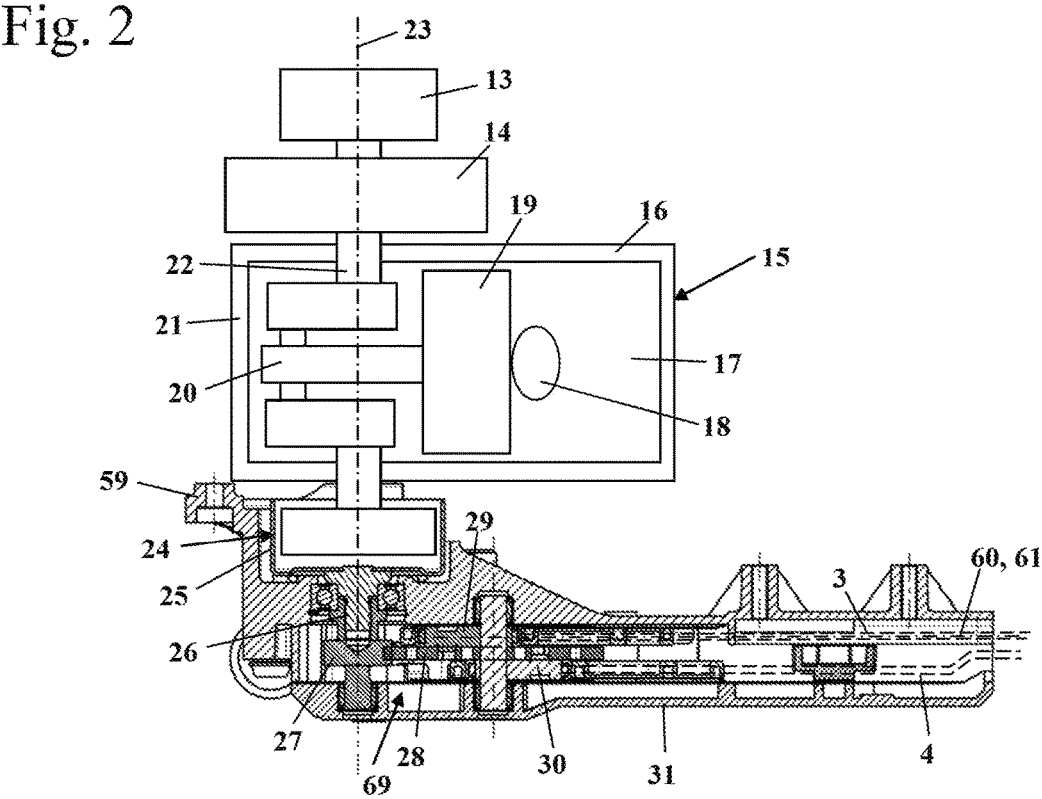
FIG. 2 is a schematic illustration of the drive of the cutting blades of the hedge trimmer.

FIG. 2 shows the configuration of the drive of the hedge trimmer 1 in detail. The hedge trimmer 1 comprises an internal combustion engine 15. The internal combustion engine 15 comprises a cylinder 16 in which a combustion chamber 17 is formed. The combustion chamber 17 is delimited by a piston 19 which is supported so as to carry out a reciprocating motion in the cylinder 16. The piston 19 drives by means of connecting rod 20 a crankshaft 22 which is supported rotatably in a crankcase 21. The crankshaft 22 is driven in rotation about an axis of rotation 23. A combustion chamber outlet 18 of the combustion chamber 17 enables the exhaust gases to exit from the combustion chamber 17. In the illustrated embodiment, a fan wheel 14 is fixed on the crankshaft 22 and serves for conveying cooling air for cooling the internal combustion engine 15. On the side of the fan wheel 14 which is facing away from the internal combustion engine 15, a starter device 13 is arranged. The starter device 13 is advantageously a cable pull starter which comprises the starter grip 12 shown in FIG. 1 for starting the engine. However, an electrically driven starter device 13 can be advantageous.

On the side of the internal combustion engine 15 which is facing away from the starter device 13 and which is positioned at the bottom in the parking position 55 (FIG. 1), a centrifugal clutch 24 is arranged. The centrifugal clutch 24 comprises a clutch drum 25 which is connected fixedly with the drive pinion 26. In the engaged state, i.e., after surpassing a coupling engine speed, the centrifugal clutch 24 connects the crankshaft 22 fixedly with the drive pinion 26. The drive pinion 26 is the input pinion of a gear drive 69. The gear drive 69 is arranged in a gear housing 31 of the hedge trimmer 1. The drive pinion 26 in the embodiment is connected fixedly with a drive gear 27 that drives an output gear 28. The output gear 28 comprises eccentrics 29 and 30 which are driving the cutting blades 3 and 4 oppositely in a reciprocating way. The gear housing 31 comprises a fastening flange 59 which serves for fixation of the gear housing 31, advantageously on the crankcase 21 of the internal combustion engine 15.

Figure 3:
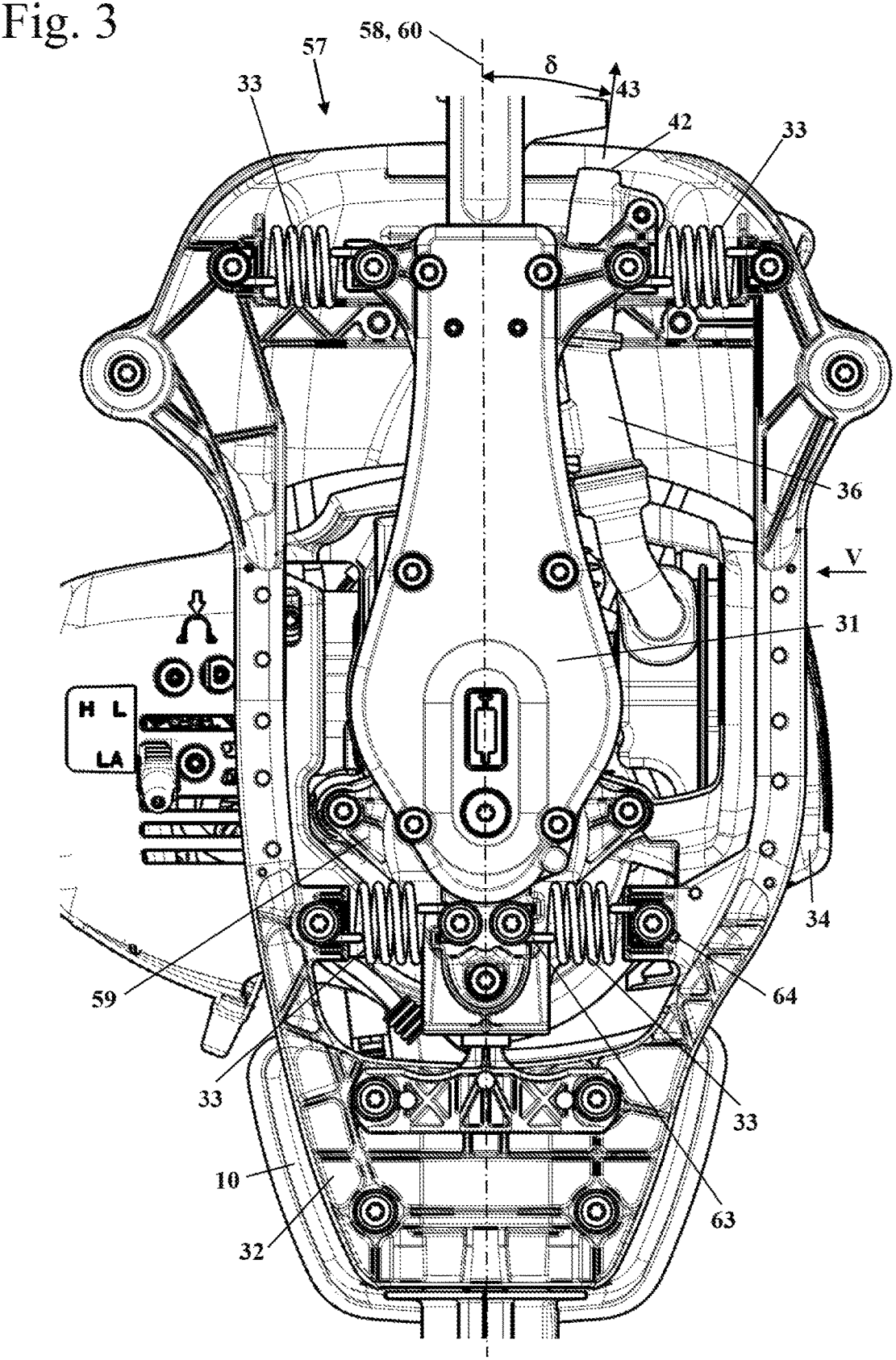
FIG. 3 is a bottom view of the hedge trimmer positioned in the parking position.

FIG. 3 shows the arrangement of the gear housing 31 on the grip housing 32. The gear housing 31 is secured by means of anti-vibration elements 33 on the grip housing 32 so as to be vibration-decoupled. In the embodiment, four anti-vibration elements 33 are provided, each embodied as a coil spring. Each anti-vibration element 33 comprises a first end 63 which is secured on the gear housing 31 as well as a second end 64 which is secured on the grip housing 32. In the embodiment, the fixation is realized by means of fastening screws. The gear housing 31 in the parking position 55 (FIG. 1) is arranged below the internal combustion engine 15. On the combustion chamber outlet 18 of the internal combustion engine 15 an exhaust gas muffler 34 is secured into which the exhaust gases flow. On the exhaust gas muffler 34, an exhaust gas pipe 36 is arranged through which the exhaust gases can be guided in the direction toward the front side 57. The exhaust gas pipe 36 comprises an outlet opening 42 through which the exhaust gases of the exhaust gas pipe 36 exit in the blow-out direction 43.

The hedge trimmer 1 comprises a longitudinal center plane 58 which contains the longitudinal center axis 60. This center plane 58 extends perpendicularly to the cutting blade plane 61 of the cutting blade 3. In the parking position 55, the center plane 58 is arranged advantageously perpendicular to the parking surface 56. This is schematically indicated in FIG. 1. In FIG. 3, the center plane 58 is perpendicular to the plane of the drawing sheet. The blow-out direction 43 is oriented away from the center plane 58. The blow-out direction 43 is positioned relative to the center plane 58 at an angle δ that advantageously amounts to at least 2°, in particular at least 5°, preferably from approximately 5° to approximately 20°. In FIG. 3, the fastening flange 59 of the gear housing 31 is illustrated also which is secured in the embodiment on the crankcase 21 of the internal combustion engine 15 (FIG. 2). In this way, the internal combustion engine 15 is vibration-decoupled from the grip housing 32.

Figure 4:
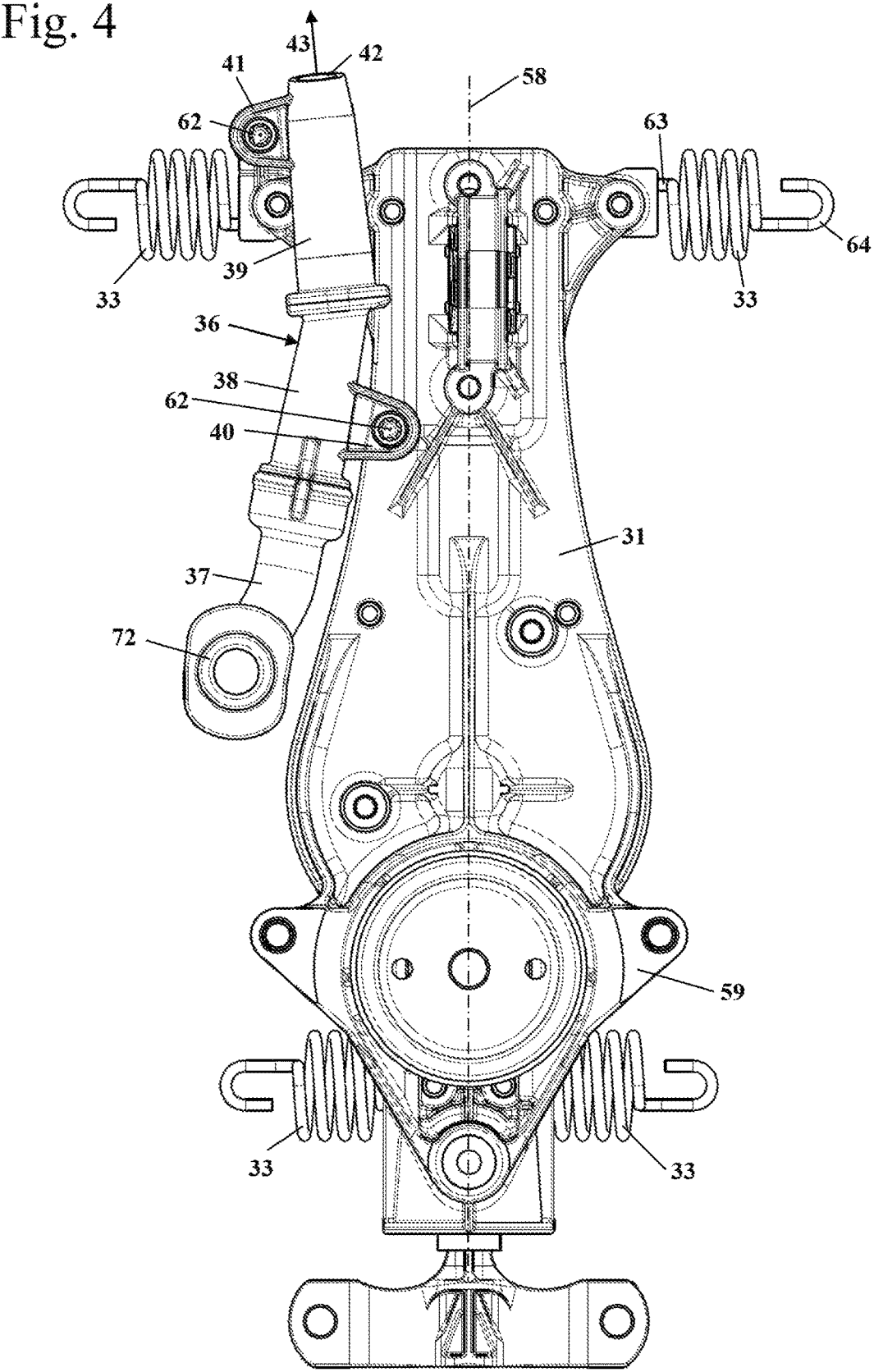
FIG. 4 is a top plan view of the gear housing and of the exhaust gas pipe in the parking position of the hedge trimmer.

In FIG. 4, the arrangement of the exhaust gas pipe 36 on the gear housing 31 is shown in detail. The exhaust gas pipe 36 is comprised of three pipe sections, i.e., a first pipe section 37, a second pipe section 38, and a third pipe section 39 which are sequentially arranged in flow direction of the exhaust gas from the exhaust gas muffler 34 to the outlet opening 42. In the embodiment, the pipe sections 37, 38, and 39 adjoin each other immediately. It can also be provided that the exhaust gas pipe 36 comprises only two pipe sections. Also, a greater number of pipe sections of the exhaust gas pipe 36 can be advantageous. All pipe sections 37, 38, 39 of the exhaust gas pipe 36 are comprised of plastic material. The first pipe section 37 is advantageously comprised of an elastomer. In this way, the first pipe section 37 has a high elasticity. The elastomer is in particular a fluoroelastomer, preferably FPM or FKM. The second pipe section 38 is comprised advantageously of a shape-stable plastic material, in particular a thermoplastic material. Preferably, the second pipe section 38 is comprised of a polyamide. The third pipe section 39 is comprised advantageously also of a shape-stable plastic material, in particular of a thermoplastic material, for example, polyamide. Preferably, the second pipe section 38 and the third pipe section 39 are comprised of the same material. However, it can also be provided that the second pipe section 38 and/or the third pipe section 39 is made of metal, in particular of a light metal, preferably of magnesium.

The exhaust gas pipe 36 comprises a first end section 72 with which the exhaust gas pipe 36 is connected seal-tightly to the exhaust gas muffler 34 (FIG. 3). On the second pipe section 38, a fastening eye 40 is provided which is projecting laterally away from the tubular base member of the second pipe section 38 and by means of which the exhaust gas pipe 36 is connected to the gear housing 31. In the embodiment, a fastening screw 62 is provided to effect fixation on the gear housing 31. The gear housing 31 is comprised advantageously of metal. The third pipe section 39 comprises a fastening eye 41. As shown in FIG. 4, the fastening eyes 40 and 41 are extending on approximately opposite sides of the exhaust gas pipe 36. The exhaust gas pipe 36 is also secured by means of the fastening eye 41 to the gear housing 31, in the embodiment by means of a fastening screw 62. FIG. 4 shows also the fastening flange 59 of the gear housing 31.

In operation, due to the reciprocating movement of the cutting blades 3 and 4, forces are generated in the gear housing 31 that cause a distortion, i.e., a slight torsion, of the gear housing 31. Since the first pipe section 37 of the exhaust gas pipe 36 is elastically designed, such relative movements of the gear housing 31 relative to the internal combustion engine 15 can be compensated despite the comparatively great length of the exhaust gas pipe 36. Accordingly, a fixed connection of the pipe sections 38 and 39 on the gear housing 31 is possible despite the configuration of the pipe sections 38 and 39 of a shape-stable plastic material and despite the seal-tight fixation of the first pipe section 37 on the exhaust gas muffler 34.

Figure 5:
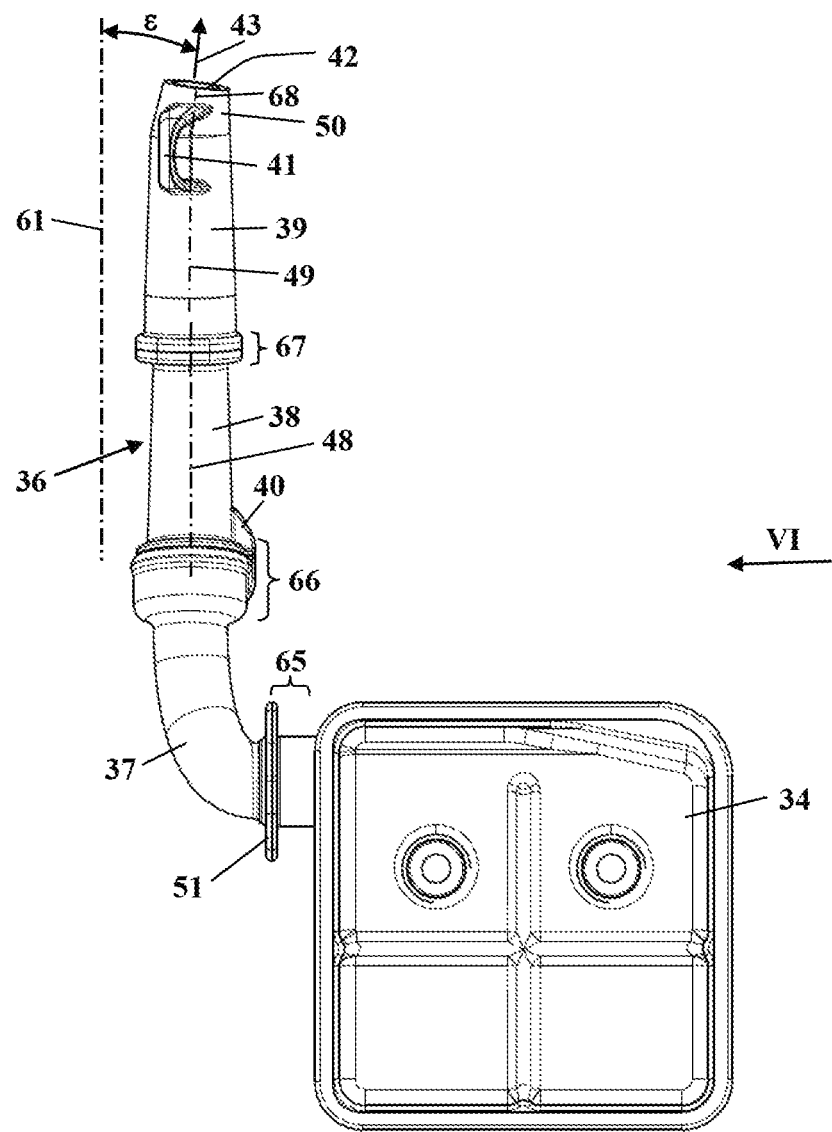
FIG. 5 is a side view of the exhaust gas muffler and of the exhaust gas pipe in the direction of arrow V of FIG. 3.

FIG. 5 shows the exhaust gas muffler 34 with exhaust gas pipe 36 arranged thereat. The first pipe section 37 of the exhaust gas pipe 36 is secured on the exhaust gas muffler 34 in a connecting area 65. The first pipe section 37 comprises at the connecting area 65 an outwardly projecting holding rim 51 where an operator can grip the exhaust gas pipe 36 and pull it off the exhaust gas muffler 34 in order to clean the exhaust gas muffler 34. Subsequently, the exhaust gas pipe 36 can be mounted again on the exhaust gas muffler 34. In this context, the operator can push against the holding rim 51 in order to push the first pipe section 37 onto an outlet socket of the exhaust gas muffler 34. The first pipe section 37 is connected with the second pipe section 38 in a connecting area 66. The fastening eye 40, as shown in FIG. 5, is arranged immediately neighboring the connecting area 66. The second pipe section 38 comprises a longitudinal center axis 48 which is extending in the embodiment approximately parallel to the cutting blade plane 61 of the cutting blade 3. The second pipe section 38 and the third pipe section 39 are connected to each other at the connecting area 67. The third pipe section 39 comprises a longitudinal center axis 49 which in the embodiment is also approximately parallel to the cutting blade plane 61. It can also be provided that the longitudinal center axis 49 in the flow direction of the exhaust gases is extending away from the cutting blade plane 61. The blow-out direction 43 is positioned relative to the plane 61 at an angle ε which is greater than 0°. The angle ε advantageously amounts to more than 2°, in particular from approximately 5° to approximately 20°. The angle ε is oriented such that the exhaust gases flow in a direction away from the cutting blade plane 61 in blow-out direction 43. The exhaust gas stream exiting from the outlet opening 42 is thus oriented away from the cutting blade plane 61 of the cutting blade 3 and oriented forwardly and upwardly relative to the parking position 55 of the hedge trimmer 1 (FIG. 1).

The third pipe section 39 comprises a nozzle section 50 at its end that is positioned downstream and provided with the outlet opening 42. In the nozzle section 50, the flow cross section decreases. Also, the exhaust gases are deflected into the blow-out direction 43. The nozzle section 50 comprises a longitudinal center axis 68 which is oriented in the blow-out direction 43 and is positioned relative to the cutting blade plane 61 at the angle E.

Figure 6:
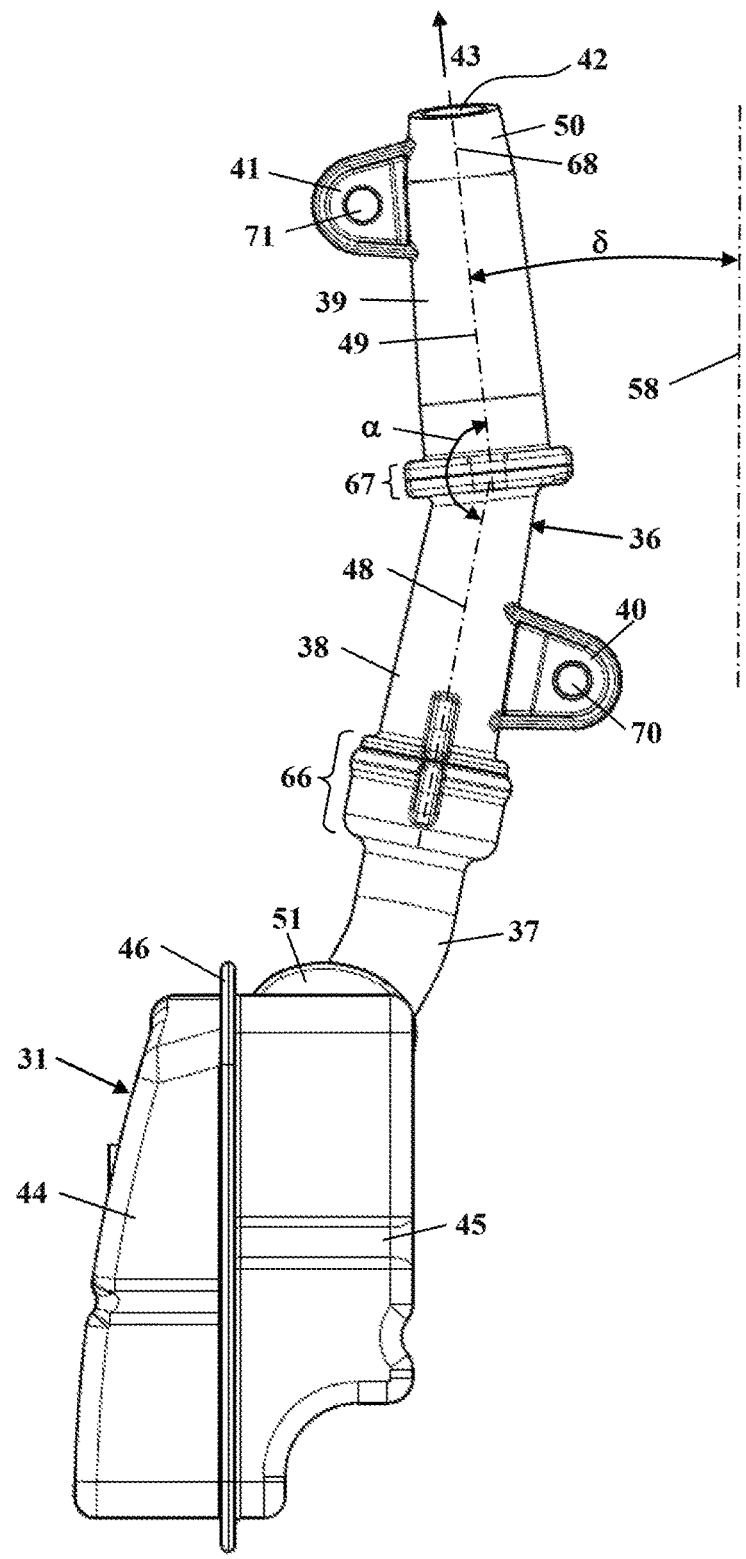
FIG. 6 is a side view in the direction of arrow VI of FIG. 5.

FIG. 6 shows exhaust gas muffler 34 and exhaust gas pipe 36 in a view from below, i.e., perpendicular to the parking surface 56 in the parking position 55 (FIG. 1). In this view, the longitudinal center axes 49 and 68 are positioned congruently on top of each other and are positioned relative to the center plane 58 at angle δ. As shown also in FIG. 6, the longitudinal center axes 48 and 49 in the view perpendicular to the parking position 56 or to the cutting blade plane 61 of the cutting blade 3 (FIG. 5) are positioned at an angle α. The angle α advantageously amounts to from approximately 2° to approximately 30°, in particular from approximately 5° to approximately 15°. The first pipe section 37 comprises an arc-shaped course as shown in FIGS. 5 and 6. Due to the three-part configuration of the exhaust gas pipe 36, the extension of the exhaust gas pipe 36 shown in the Figures can be produced in a simple way. As also shown in FIG. 6, the fastening eye 40 has a fastening opening 70 and the fastening eye 41 has a fastening opening 71. The fastening screws 62 (FIG. 4) project through the fastening openings 70, 71.

In FIG. 6, the configuration of the exhaust gas muffler 34 is also illustrated. The exhaust gas muffler 34 comprises a first half shell 44 and a second half shell 45 which are connected to each other at a circumferential rim 46. The half shells 44 and 45 are advantageously deep-drawn parts of sheet metal.

Figure 7:
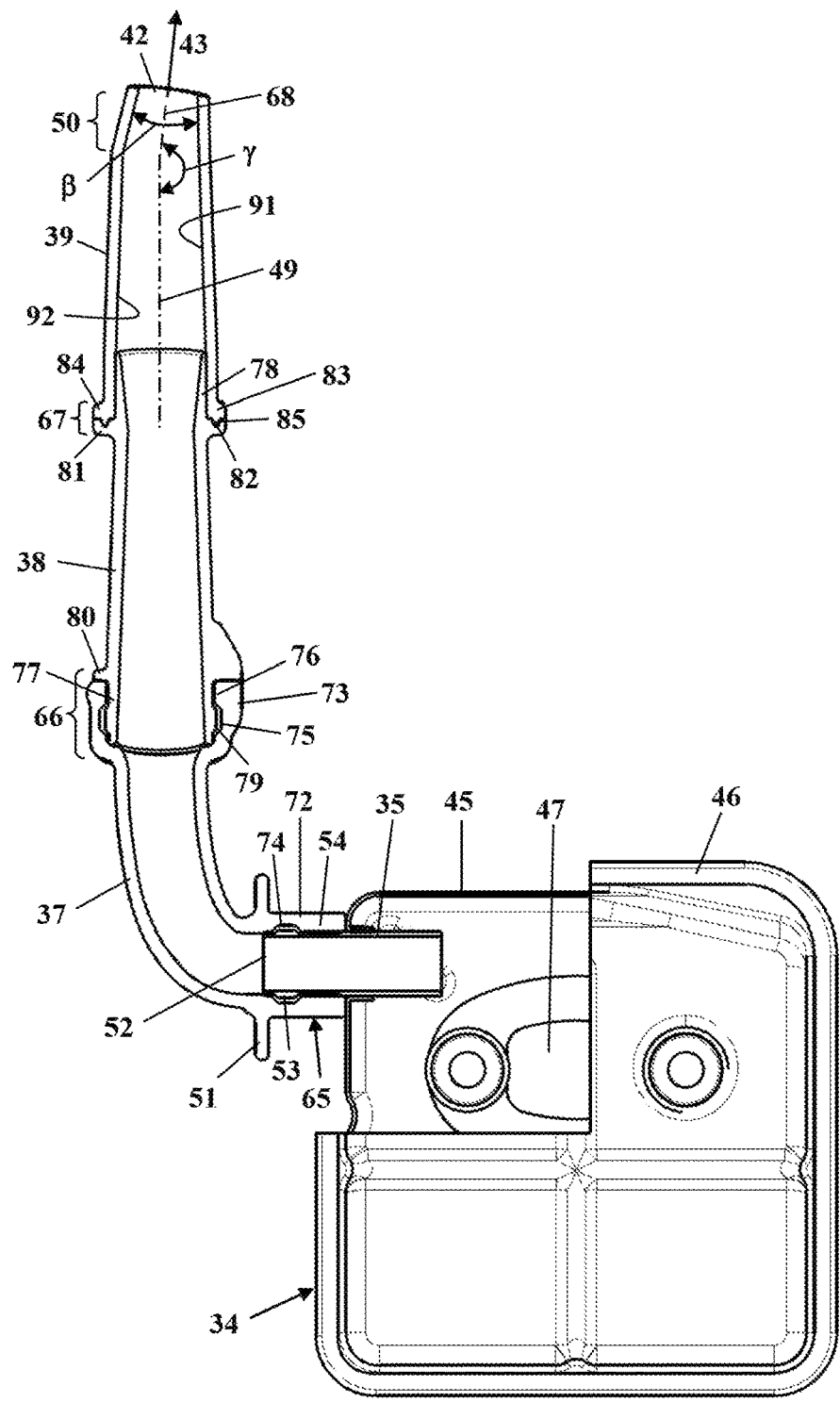
FIG. 7 is a partially sectioned illustration of exhaust gas muffler and exhaust gas pipe.

As shown in FIG. 7, the exhaust gas muffler 34 comprises an outlet socket 35 which is secured on the half shell 45. Due to the comparatively simple configuration of the exhaust gas muffler 34, the tolerances of the position of the outlet socket 35 are comparatively great. Due to the elastic embodiment of the first pipe section 37, these tolerances can be compensated. As also shown in FIG. 7, the first half shell 45 has an inlet opening 47 through which the exhaust gases from the combustion chamber outlet 18 flow into the exhaust gas muffler 34. The outlet socket 35 comprises an outlet 52 through which the exhaust gases exit the exhaust gas muffler 34.

As shown in FIG. 7, the first pipe section 37 in the connecting area 65 is secured seal-tightly on the outlet socket 35 of the exhaust gas muffler 34. The end section 72 of the first pipe section 37 is pushed across the outlet socket 35. On the outlet socket 35 an outwardly projecting bead 53 is formed which in the embodiment is designed to extend about the circumference. The bead 53 is engaged from behind by a holding section 54 on the first end section 72. The bead 53 projects into a circumferential groove 74 of the end section 72. A seal-tight fixation is achieved by a matching configuration of the inner diameter of the holding section 54 and of the groove 74.

In the connecting area 66, a first end section 77 of the second pipe section 38 projects into a second end section 73 of the first pipe section 37 of the exhaust gas pipe 36. The first and second pipe sections 37 and 38 are also connected seal-tightly to each other in the connecting area 66. For this purpose, a circumferentially extending bead 79 is formed on the end section 77 which projects into a groove 75 of the end section 73 and is engaged from behind by a holding section 76 of the end section 73. On the second pipe section 38, a stop rim 80 is formed on which the first pipe section 37 abuts advantageously with its end face.

The second pipe section 38 and the third pipe section 39 are connected seal-tightly to each other in the connecting area 67. The second pipe section 38 comprises a second end section 78 which is projecting into a first end section 83 of the third pipe section 39. On the second end section 78 of the second pipe section 38 an outwardly projecting rim 81 is formed. The first end section 83 of the third pipe section 39 comprises an outwardly projecting rim 84. The rims 81 and 84 are abutting with their end faces against each other. For a seal-tight connection, a web 85 is provided on the rim 84 and projects into a groove 82 of the rim 81. The web 85 and the groove 82 extend in this context in axial direction and annularly about the longitudinal center axis 49 of the third pipe section 39. It can also be provided that a seal is arranged between the second pipe section 38 and the third pipe section 39. In order to secure the connection between the second pipe section 38 and the third pipe section 39 and to also prevent detachment or loosening of the connection in case of vibrations occurring in operation, additionally a locking connection between the second pipe section 38 and the third pipe section 39 can be provided which, for example, can be formed by one or several locking hooks. Alternatively, an adhesive connection can be advantageous also.

As shown in FIG. 7, the second pipe section 38 comprises its smallest inner diameter in the area of the rim 81 in the embodiment. Beginning at this area, the inner diameter increases in the direction of the first end section 77 and in the direction of the second end section 78. When manufacturing the second pipe section 38 by injection molding, demoulding of the channel which is formed in the interior of the second pipe section 38 is simply done from the end sections 77 and 78 due to the described configuration. The inner diameter of the third pipe section 39 decreases from the first end section 83 to the outlet opening 42. When producing the third pipe section 39 by injection molding, the third pipe section 39 is therefore to be demoulded at the first end section 83. The configuration of the nozzle section 50 is selected such that no undercuts are formed despite the angle $\gamma$ between the longitudinal center axes 49 and 68. As shown in FIG. 7, the flow cross section decreases in the nozzle section 50. The third pipe section 39 comprises a first inner wall 91 which extends in the illustrated section plane perpendicularly to the cutting blade plane 61 and perpendicularly to the parking surface 56 in the parking position 55 (FIG. 1). The oppositely positioned inner wall 92 comprises a bend at the transition into the nozzle section 50. In this way, the angle between the longitudinal center axes 49 and 68 is formed. In the nozzle section 50, the inner walls 91 and 92 are positioned at an angle $\beta$ relative to each other that amounts to from 10° to 40°, in particular from 20° to 30°. The longitudinal center axes 49 and 68 are positioned in the illustrated section illustration at an angle $\gamma$ to each other which is advantageously smaller than 178°. The angle $\gamma$ advantageously amounts to from approximately 160° to approximately 175°.

Figure 8:
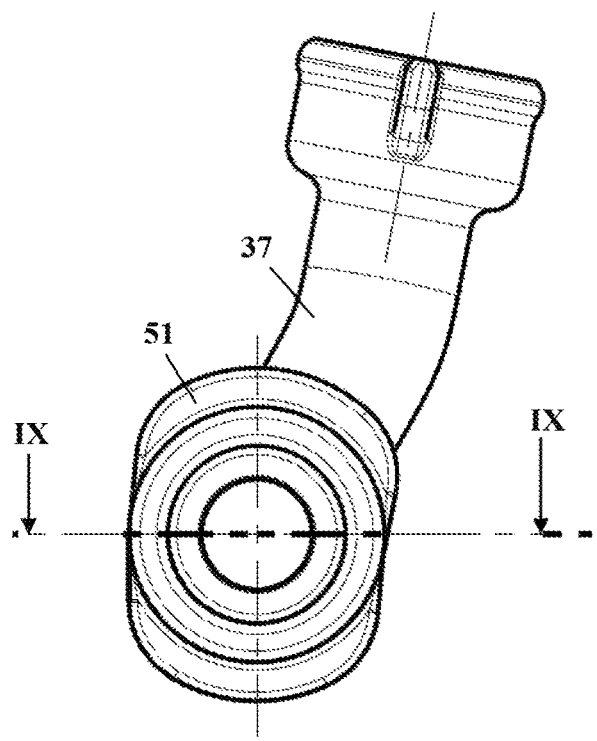
FIG. 8 is a side view of an embodiment of a first pipe section of the exhaust gas pipe.

FIG. 8 shows an embodiment of the first pipe section 37. As shown in FIG. 8, the holding rim 51 is not designed to be extending all the way circumferentially about the first pipe section 37 but extends across two partial areas which are positioned approximately opposite each other. The partial areas of the holding rim 51 are arranged such that minimal space is required and the holding rim 51 at the same time can be easily gripped by the operator.

Figure 9:
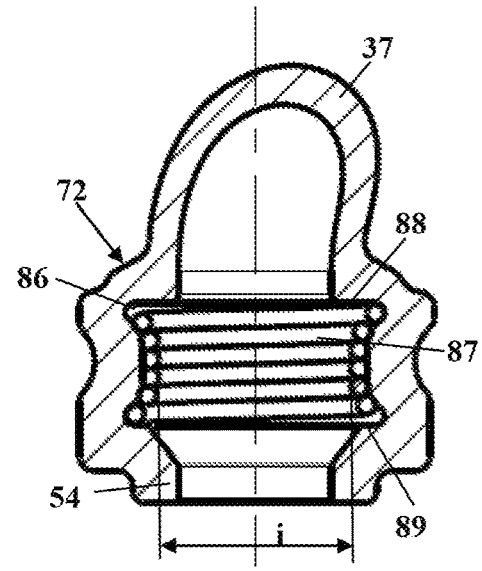
FIG. 9 is a section view along the section line IX-IX of FIG. 8.

In the embodiment according to FIG. 9, the first pipe section 37 comprises at its first end section 72 a metallic insert which effects clamping on the outlet socket 35 of the exhaust gas muffler 34. The metallic insert is elastic in this embodiment. In the embodiment, the metallic insert is designed as a spring 87. The spring 87 is a coil spring which has its smallest inner diameter i in a central area of its length extension. The coil spring widens at its end areas. The spring 87 is arranged in a receptacle 86 which is formed in the first end section 72. The receptacle 86 comprises a first step 88 as well as an oppositely positioned second step 89. The spring 87 is supported in axial direction on the steps 88 and 89. The holding section 54 which provides the sealing action can be designed to be shorter in this embodiment than in the embodiment illustrated in FIG. 7. The spring 87 can be arranged on the bead 53 or can engage from behind the bead 53.

Figure 10:
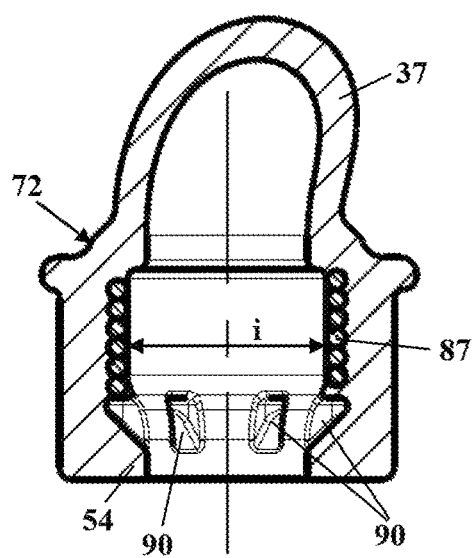
FIG. 10 is a section view of a further embodiment of the first pipe section of an exhaust gas pipe in a section plane along the section line IX-IX of FIG. 8.

FIG. 10 shows a further embodiment of the first end section 72 in which a spring 87 is embedded by injection molding in the end section 72. The inner diameter i of the spring 87 is constant in this embodiment. Between the spring 87 and the holding section 54 recesses 90 are provided on the inner wall of the first pipe section 37 which enable fixation of the spring 87 during manufacture of the first pipe section 37 by means of an appropriate tool and which at the same time simplify demoulding of the first pipe section 37.

In all embodiments, identical reference characters identify elements which are corresponding to each other. The elements which are not illustrated in the embodiments of FIGS. 9 and 10 are advantageously designed in accordance with the first embodiment. The disclosed connections of the pipe sections 37, 38, and 39 can be combined in any suitable way with each other. At all connecting areas 65, 66, 67 seals and/or additional securing elements such as locking elements or the like can be advantageous. Additional securing elements can also be formed by one or a plurality of weld connections.

FIGS. 11 and 12 show in a detail view a further embodiment of a hedge trimmer 1. In all Figures, same reference characters identify elements that are corresponding to each other. The hedge trimmer 1 of FIGS. 11 and 12 is substantially of the same configuration as the hedge trimmer 1 and its components illustrated in FIGS. 1 through 10. An exhaust gas pipe 36 is provided which is comprised advantageously of three pipe sections 37, 38, and 39. In the embodiment according to FIGS. 11 and 12, additionally a securing action of the connecting location 66 is provided in order to prevent that the pipe sections 37 and 38 of the exhaust gas pipe 36 can be pulled apart, for example, by branches that are laterally pushed underneath the exhaust gas pipe 36. The hedge trimmer 1 comprises a motor housing 93 in which the internal combustion engine 15 (FIG. 2) is arranged. The motor housing 93 can also be formed partially by the internal combustion engine 15 itself, for example, by the crankcase 21 (FIG. 2) of the internal combustion engine 15.

In the embodiment according to FIGS. 11 and 12, ribs 94 and 95 are arranged on the motor housing 93. The ribs 94 and 95 serve for securing the position of the exhaust gas pipe 36. The ribs 94 and 95 are in particular monolithic with the motor housing 93. The ribs 94 and 95 project on both sides into a position next to the exhaust gas pipe 36. The end face of the widened collar of the second end section 73 of the first pipe section 37 is positioned immediately adjacent to the ribs 94 and 95 and delimits the movement of the exhaust gas pipe 36 transverse to the ribs 94 and 95. The spacing between the ribs 94 and 95 is dimensioned such that the connecting area 66 is too wide to be pulled between the ribs 94 and 95. In this way, the first pipe section 37 of the exhaust gas pipe 36 is secured in its longitudinal direction between the ribs 94 and 95. This can be seen clearly in FIG. 12. As shown also in FIG. 12, the rib 94 is advantageously comprised of two rib sections 98 and 99 that are extending at an angle relative to each other. The rib section 99 is positioned transversely to the exhaust gas pipe 36. The rib section 98 of the rib 94 is positioned laterally relative to the length section of the first pipe section 37 of the exhaust gas pipe 36 immediately adjacent to the exhaust gas pipe 36 and guides this first pipe section 37 of the exhaust gas pipe 36. Due to the angled configuration of the rib 94 the stability of the rib 94 is increased.

The ribs 94 and 95 are in particular advantageous when the first pipe section 37 of the exhaust gas pipe 36 is made of plastic material. The first pipe section 37 in operation can become soft due to the high temperatures of the exhaust gas flowing through the first pipe section 37. Due to the ribs 94 and 95 the position of the first pipe section 37 of the exhaust gas pipe 36 is reliably secured even at high exhaust gas temperatures.

In order to achieve an improved connection of the pipe sections 38 and 39, the embodiment according to FIGS. 11 and 12 provides that the pipe sections 38 and 39 are welded to each other. The weld connection is realized in particular by means of ultrasonic welding at two oppositely positioned weld locations 96 and 97. The sealing action of the pipe sections 38 and 39 can be realized by means of the geometry of the web 85, as shown in FIG. 7, which projects into the groove 82.

It can also be provided that the web 85 and the groove 82 (FIG. 7) are omitted, in particular when a sufficient seal-tightness of the connecting area 67 is provided by other means.

The specification incorporates by reference the entire disclosure of German priority document 10 2016 004 746.1 having a filing date of Apr. 20, 2016.

While specific embodiments of the invention have been shown and described in detail to illustrate the inventive principles, it will be understood that the invention may be embodied otherwise without departing from such principles.

What is claimed is:

1. A hedge trimmer comprising:
   at least one cutting blade;
   an internal combustion engine operatively connected to the at least one cutting blade and driving the at least one cutting blade reciprocatingly;
   the internal combustion engine comprising an exhaust gas muffler comprising an outlet configured to discharge exhaust gases from the exhaust gas muffler;
   a multi-part exhaust gas pipe connected seal-tightly to the outlet of the exhaust gas muffler and connecting the outlet of the exhaust gas muffler to an outlet opening where the exhaust gases exit;
   the multi-part exhaust gas pipe comprising a plurality of pipe sections, including at least a first pipe section and a second pipe section, wherein the second pipe section is embodied separate from the first pipe section;
   wherein at least one of the plurality of pipe sections is comprised of plastic material.

2. The hedge trimmer according to claim 1, wherein the first pipe section and the second pipe section are comprised of different materials.

3. The hedge trimmer according to claim 1, wherein the first pipe section is comprised of an elastomer.

4. The hedge trimmer according to claim 1, wherein the second pipe section is comprised of a shape-stable plastic material.

5. The hedge trimmer according to claim 1, wherein the exhaust gas muffler comprises an outlet socket and the outlet of the exhaust gas muffler is formed on the outlet socket, wherein the outlet socket comprises a circumferentially extending bead, and wherein the first pipe section engages the bead.

6. The hedge trimmer according to claim 1, wherein the first pipe section comprises a metallic insert secured by clamping action on the exhaust gas muffler.

7. The hedge trimmer according to claim 1, wherein the at least one cutting blade is projecting from a front side of the hedge trimmer in a forward direction and wherein the exhaust gases exit from the outlet opening in a blow-out direction that, relative to a parking position of the hedge trimmer, is oriented forwardly and upwardly.

8. The hedge trimmer according to claim 1, wherein the at least one cutting blade comprises a longitudinal center axis and a cutting blade plane, wherein the hedge trimmer comprises a longitudinal center plane that contains the longitudinal center axis of the at least one cutting blade and is positioned perpendicular to the cutting blade plane of the least one cutting blade, wherein the exhaust gases exit from the outlet opening in a blow-out direction and the blow-out direction of the outlet opening is oriented away from the longitudinal center plane of the hedge trimmer.

9. The hedge trimmer according to claim 1, wherein the exhaust gas pipe comprises a nozzle section in an area located upstream of the outlet opening, wherein a flow cross section of the nozzle section decreases in a flow direction of the exhaust gases flowing from the exhaust gas muffler to the outlet opening.

10. The hedge trimmer according to claim 1, wherein the second pipe section comprises a fastening eye for fixation of the second pipe section on a housing part of the hedge trimmer.

11. The hedge trimmer according to claim 1, wherein the plurality of pipe sections includes a third pipe section which adjoins the second pipe section.

12. The hedge trimmer according to claim 11, wherein the outlet opening is formed on the third pipe section.

13. The hedge trimmer according to claim 11, wherein a longitudinal center axis of the second pipe section is positioned relative to a longitudinal center axis of the third pipe section at an angle that amounts to from approximately 2° to approximately 30°.

14. The hedge trimmer according to claim 11, wherein the third pipe section is comprised of a shape-stable plastic material and comprises a fastening eye for fixation of the third pipe section on a housing part of the hedge trimmer.

15. The hedge trimmer according to claim 1, further comprising a motor housing and further comprising at least one rib disposed on the motor housing, wherein the at least one rib is configured to secure a position of the exhaust gas pipe on the hedge trimmer.

* * * * *